United States Patent
Wang et al.

(10) Patent No.: US 7,852,380 B2
(45) Date of Patent: Dec. 14, 2010

(54) SIGNAL PROCESSING SYSTEM AND METHOD OF OPERATION FOR NONLINEAR SIGNAL PROCESSING

(75) Inventors: Xiaoling Wang, San Jose, CA (US); Alexander Berestov, San Jose, CA (US); Takami Mizukura, Kawasaki (JP); Naoya Katoh, Ichikawa (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 907 days.

(21) Appl. No.: 11/738,443

(22) Filed: Apr. 20, 2007

(65) Prior Publication Data

US 2009/0322916 A1 Dec. 31, 2009

(51) Int. Cl.
*H04N 5/228* (2006.01)
(52) U.S. Cl. .................................. 348/222.1
(58) Field of Classification Search ............. 348/222.1, 348/254, 273
See application file for complete search history.

(56) References Cited

U.S. PATENT DOCUMENTS

| 5,408,598 | A | 4/1995 | Pryor, Jr. |
| 5,694,535 | A | 12/1997 | Broekjuijsen |
| 5,731,820 | A | 3/1998 | Broekhuijsen |
| 6,512,841 | B2 | 1/2003 | Yamada et al. |
| 6,882,217 | B1 | 4/2005 | Mueller |
| 7,414,753 | B2 * | 8/2008 | Tin ............................ 358/1.9 |
| 7,663,668 | B2 * | 2/2010 | Kuno et al. ............... 348/222.1 |
| 2004/0138886 | A1 | 7/2004 | Absar et al. |
| 2005/0147324 | A1 * | 7/2005 | Kwoh et al. ................. 382/293 |
| 2008/0001969 | A1 * | 1/2008 | Kondo et al. ................ 345/633 |

OTHER PUBLICATIONS

Michael Plass and Maureen Stone, "Curve-Fitting with Piecewise Parametric Cubics", Computer Graphics, Jul. 1983, v. 17, No. 3, Imaging Sciences Laboratory, Xerox Palo Alto Research Center.

* cited by examiner

*Primary Examiner*—Gevell Selby
(74) *Attorney, Agent, or Firm*—Mikio Ishimaru

(57) ABSTRACT

A signal processing system includes: defining a nonlinear function; defining a set of requirements for an output signal; obtaining an input signal; applying a cubic polynomial fitting to approximate the nonlinear function and provide an approximated nonlinear function; assigning a set of fitted polynomial parameters to the approximated nonlinear function; transforming the input signal with the approximated nonlinear function to provide a transformed signal; modifying the transformed signal by adjusting the set of fitted polynomial parameters to provide a modified signal meeting the set of requirements for the output signal; and outputting the modified signal.

20 Claims, 7 Drawing Sheets

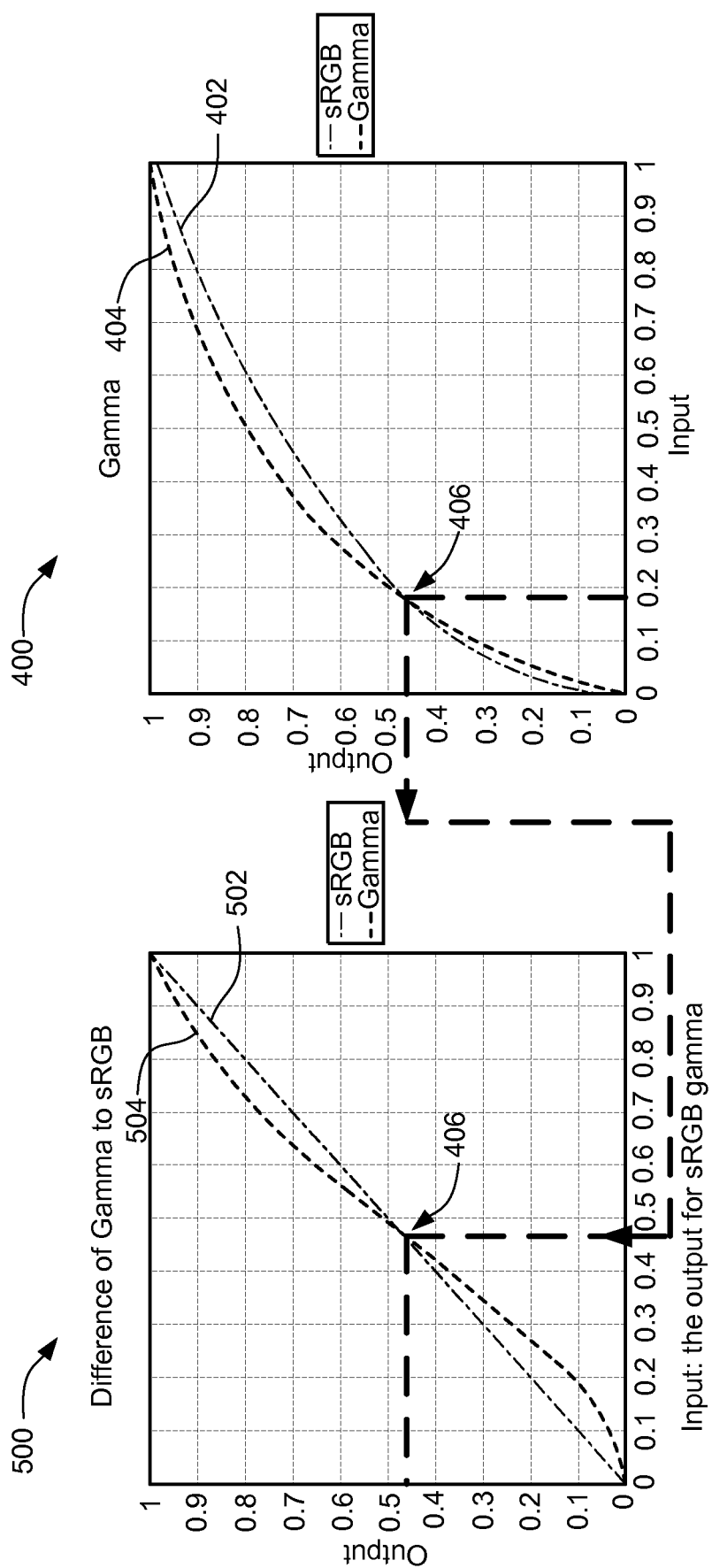

SIGNAL PROCESSING SYSTEM AND METHOD OF OPERATION FOR NONLINEAR SIGNAL PROCESSING

TECHNICAL FIELD

The present invention relates generally to signal processing, and more particularly to a system for nonlinear signal processing.

BACKGROUND ART

Signal processing is used in virtually every type of electronic device ranging from satellite communication systems to digital cameras. Many of the signals processed are nonlinear with various peaks and valleys in the signal. For processing a signal every single point on the nonlinear curve should be known. However, this involves a tremendous number of parameters to locate every point. Thus, a nonlinear optimization process is used to approximate the nonlinear curve. Unfortunately, this still involves a large number of parameters. On one hand, this increases the computation complexity involved in the approximation and, on the other hand, it increases the possibility that the optimization process will be trapped into one of the local minima, or valleys, of the nonlinear curve.

To date, an enormous amount of research has been performed in an attempt to develop multiple-variable optimization methods to avoid local minima and directly locate the global minimum or lowest valley for the entire non-linear curve without developing a simple system.

In another approach, the number of parameters is reduced through a simplification of the nonlinear objective function. The simplest way to approximate the nonlinear curve is to use piecewise linear functions. However, unless the curves being approximated are also piecewise linear, a large number of endpoint coordinates for the linear functions must be created to achieve reasonable accuracy.

Thus, a need still remains for nonlinear optimization in signal processing. In view of the increasing use of signal processing, it is becoming increasingly critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a signal processing system including: defining a nonlinear function; defining a set of requirements for an output signal; obtaining an input signal; applying a cubic polynomial fitting to approximate the nonlinear function and provide an approximated nonlinear function; assigning a set of fitted polynomial parameters to the approximated nonlinear function; transforming the input signal with the approximated nonlinear function to provide a transformed signal; modifying the transformed signal by adjusting the set of fitted polynomial parameters to provide a modified signal meeting the set of requirements for the output signal; and outputting the modified signal.

Certain embodiments of the invention have other aspects in addition to or in place of those mentioned above. The aspects will become apparent to those skilled in the art from a reading of the following detailed description when taken with reference to the accompanying drawings.

BRIEF DESCRIPTION OF THE DRAWINGS

FIGS. 4 and 5 are a gamma domain chart and a difference of gamma to sRGB domain chart;

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or electrical or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

In addition, where multiple embodiments are disclosed and described having some features in common, for clarity and ease of illustration, description, and comprehension thereof, the latter appearing embodiments will be described as being similar to formerly described embodiments.

The term "system" as used herein refers to and is defined as the method and as the apparatus of the present invention in accordance with the context in which the term is used.

Figure 1:
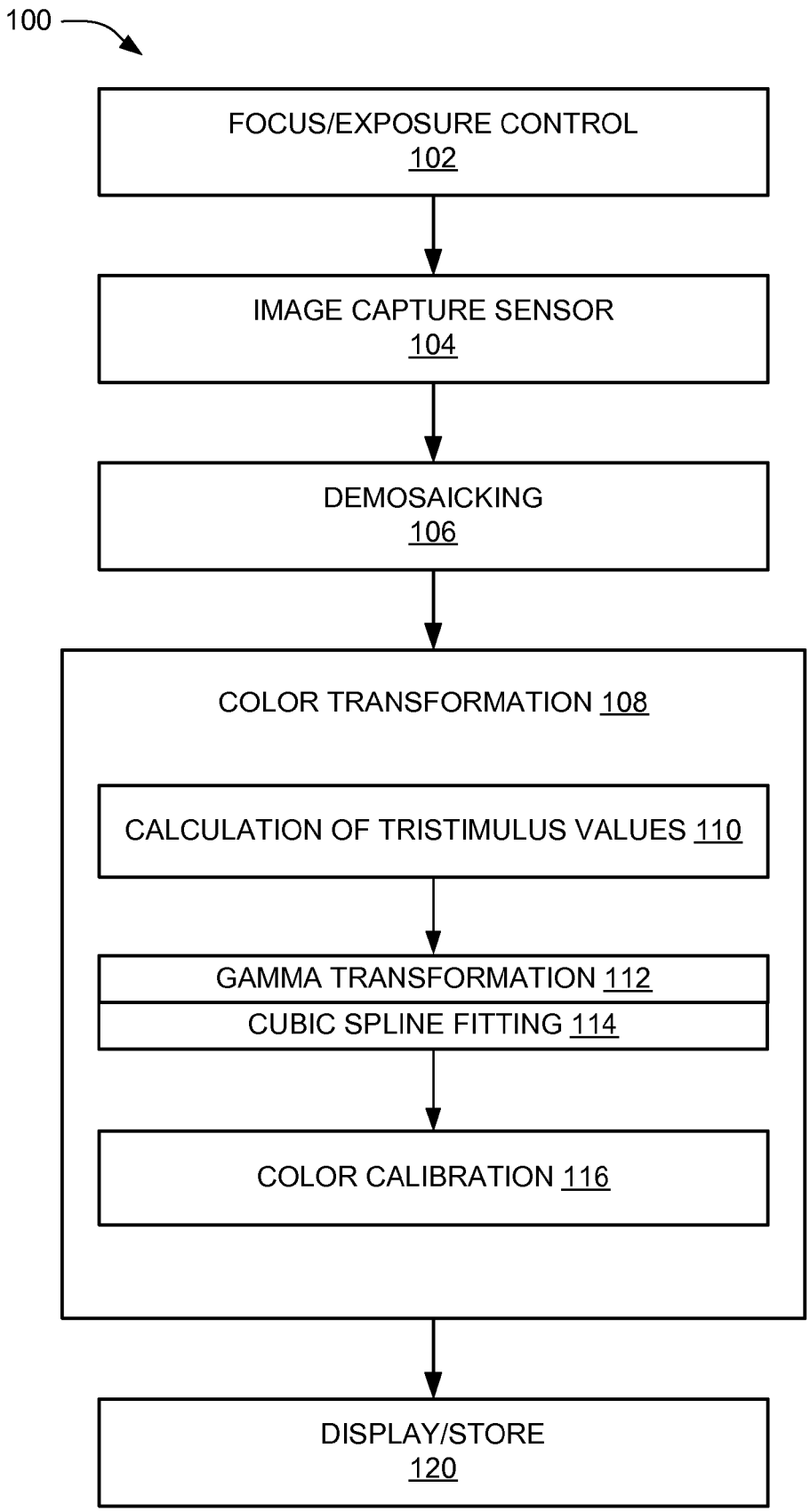
FIG. 1 is a view of an application in which an embodiment of the present invention is used.

Referring now to FIG. 1, therein is shown an application in which embodiments of the present invention are used. The example shown is of a digital still camera (DSC) represented by a DSC signal processing pipeline 100, although those skill in the art would recognize the applicability of various embodiments of the present invention to many other signal processing applications based on the following disclosure. Further, it will be evident from the present disclosure that the system's steps may be implemented by circuitry and/or systems performing the same functions in a DSC system.

A focus/exposure control 102 determines the exposure time and focus setting for the DSC.

An image capture sensor 104 captures an image as pixels on a charge coupled device (CCD) using the settings provided by the focus/exposure control 102. Automatic exposure in the DSC typically assesses luminance levels and adjusts the exposure (time and/or aperture size). White balance corrects for the scene illuminant.

Since the image sensor is typically overlaid with a color filter array, which is a mosaic pattern of colors, each photodetector is sensitive to only one color spectral band. Therefore, each pixel only captures one of the three channels red, green, or blue (RGB) colors, and the other two colors are obtained by interpolation from neighboring pixels.

An output signal from the image capture sensor 104 is an input signal for demosaicking 106 to interpolate the missing color information at each pixel location.

From demosaicking 106, a demosaicked signal is then provided for color transformation 108, which renders the captured and demosaicked image in various spaces where color correction and noise reduction are required.

In the color transformation 108, various linear and nonlinear functions are used to modify and transform the demosaicked signal.

An example is in the calculation of tristimulus values 110 in which a linear signal is converted to a nonlinear signal. Image data of colorimetric lightness L* (lightness) and received colorimetric chromaticities a*b* (hue and chroma) in a CIEL*a*b* color matching system obtained by using tristimulus values (X,Y,Z) of an exemplary CIEXYZ color matching system specified by the International Commission on Illumination (Commission Internationale de l'Eclairage (CIE)) or otherwise can be utilized. The three letters, X,Y,Z, refer to the three coordinates used to define the color information. It will be understood that other color matching systems may be used.

The nonlinear output of the calculation of tristimulus values 110 is then subject to the gamma transformation 112. Gamma is an adjustment to the light intensity (brightness) of a display or printer in order to match the output image more closely to the original image.

The gamma transformation 112 involves transformation of the tristimulus values from the calculation of tristimulus values 110 into sRGB space or scRGB, which are device-independent color space standards based on a well-defined virtual cathode ray tube (CRT). The sRGB is short for the standard color space established by the International Engineering Consortium (IEC) (specification no. 61966-2-1), and scRGB is short for the standard extended color space (IEC specification no. 61966-2-2). The gamma transformation 112 converts an input linear RGB (red, green, blue) signal into nonlinear RGB values.

It has been discovered that, by applying a cubic polynomial fitting to approximate the nonlinear gamma function and assigning a set of fitted polynomial parameters to the nonlinear gamma function to provide a nonlinear signal, the gamma transformation 112 can be more easily accomplished than previously possible.

It has also been discovered that by defining the set of requirements for output signal as a measure of goodness, it is possible to adjust the set of fitted polynomial parameters to optimize the signal processing system by maximizing the goodness of the modified signal and provide an approximated ideal gamma function following the curve 404 of FIG. 4.

The term "measure of goodness" is defined to refer to the fitness of the output signal regarding an application-specific objective function. The definition of goodness could be different for different situations. Goodness defines the signal that is good, valuable, or useful. It could be a measure to evaluate the likelihood that a given camera would perceive a given color in an identical manner to a human eye or the theoretical likelihood of estimating the scene's spectra from the camera's responses. Sometimes, it is a measure of how two curves fit or approximate each other (it can be, for example, a sum of the squares of the ordinate differences between points generated by some function and corresponding points in the data). But it could be something else very complicated or very simple (for example, the value of a complicated signal-dependent function should be minimal, or simply the amplitude of a good signal should not be larger than some value).

It has further been discovered that the set of fitted polynomial parameters may be adjusted in the initial design of different camera systems and then locked to provide a modified signal approximating a predetermined modified signal to calibrate the nonlinear signal processing system. Further, each camera has slightly different components even for a specific camera system so the set of fitted polynomial parameters can also be adjusted and locked into the individual camera so the individual camera will provide the same output images for the same input image. Similarly, for different images, the gamma curve 404 will change slightly and the camera can be set to adaptively modify the set of fitted polynomial parameters based on the different input signals.

The nonlinear RGB values are input to color calibration 116, which converts the values to linear space colors to match the light sensitivity of the human visual system.

The output of the color transformation 108 is a signal for a display/store 118, such as in a DSC LCD (liquid crystal display) viewfinder or a memory storage system. It will be understood that various other types of displays, other than conventional cathode ray tube displays, can use the output of the color transformation 108.

Figure 2:
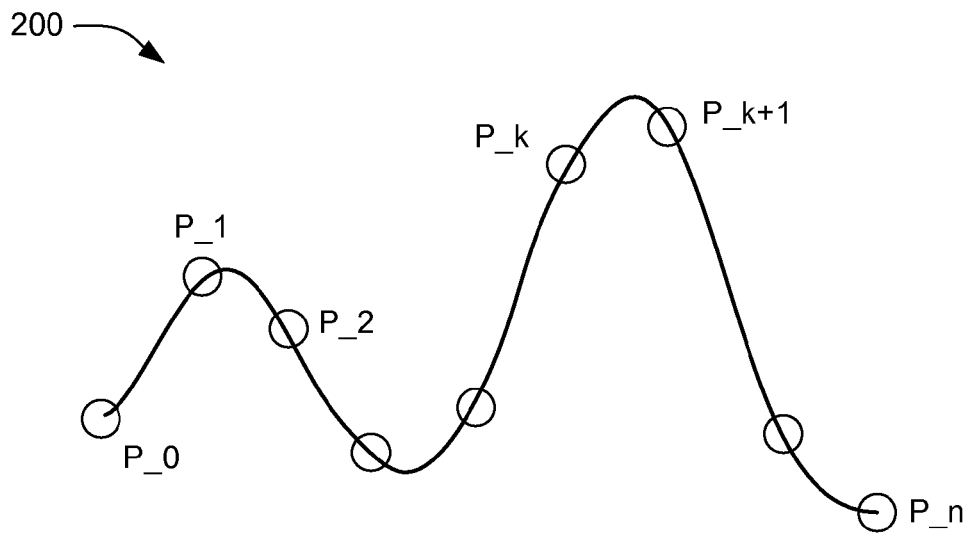
FIG. 2 is a view of an exemplary piecewise continuous cubic spline fitting of a nonlinear curve.

Referring now to FIG. 2, therein is shown an exemplary piecewise continuous cubic spline fitting 200 of a nonlinear curve.

The basic idea of cubic spline fitting is to use a composition of cubic polynomials to represent a nonlinear curve. Cubic polynomials offer a reasonable compromise between flexibility and speed of computation. Compared to higher-order polynomials, cubic splines require less calculation and memory, are more stable, and are more flexible for modeling arbitrary curves than lower-order polynomials.

Given a set of control points P_0, P_1, P_2 ... P_K, P_K+1 ... P_n, cubic splines are obtained by fitting the control points with piecewise cubic polynomials that pass through every control point. For n+1 control points, cubic splines fitting of these control points are specified by the coordinates:

$$p_i = (x_i, y_i), i=0,1,\Lambda,n.$$

The cubic polynomial to be fitted between each pair of control points is defined as:

$$f_k(t) = d_k t^3 + c_k t^2 + b_k t + a_k$$

where: $t \in [0,1]$ and $k=0,1,\Lambda,n-1$

It is necessary to determine the values of the four coefficients a, b, c, and d in the polynomial representation for each of the n curve sections between the n+1 control points. This is achieved by setting boundary conditions at the "joints" between curve sections to provide a fitted cubic polynomial nonlinear signal as follows:

The function values at the two ends of each curve section equal to values of corresponding control points.

The first and second derivatives at the end of a curve section equal to the first and second derivatives at the start of the connecting curve section.

The second derivatives at the end points of the curve approximating the nonlinear signal are set to zero, i.e., $$f''_0(0) = 0$$

$$f''_{n-1}(1) = 0$$

The piecewise continuous cubic spline fitting 200 of n+1 control points resulting from the above is shown in FIG. 2.

Figure 3:
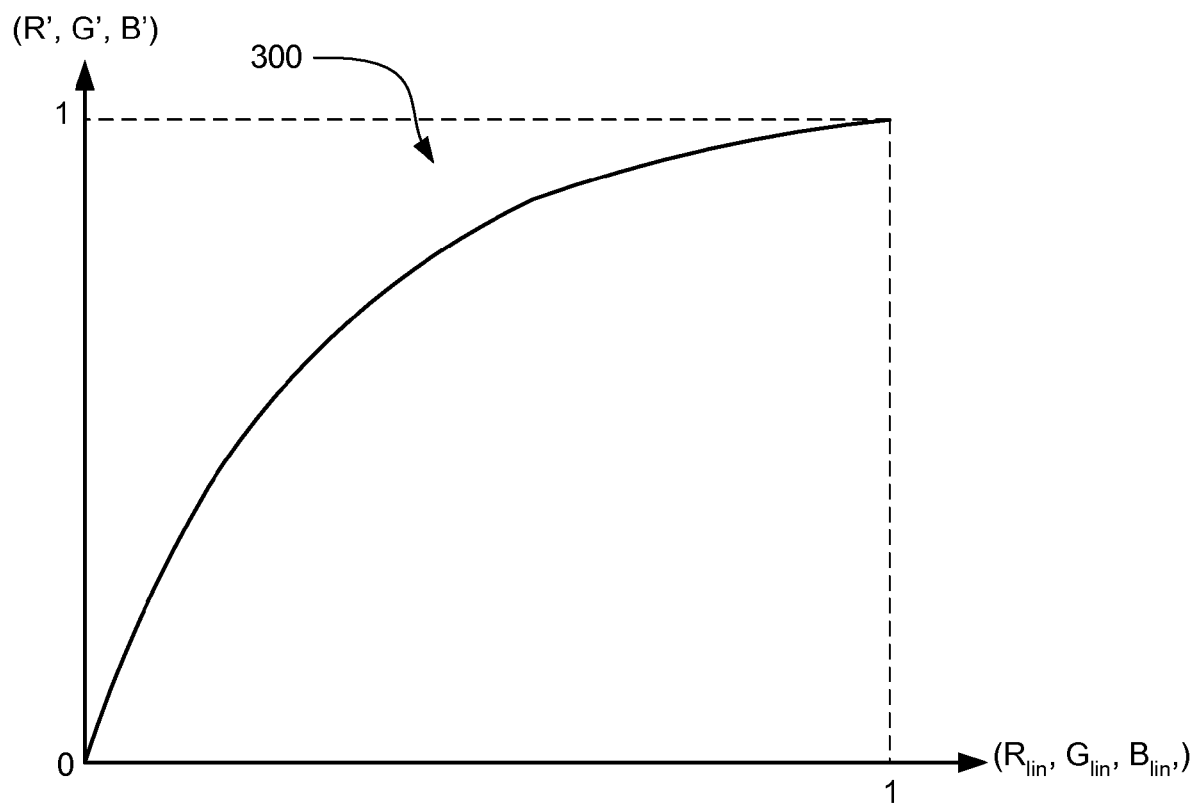
FIG. 3 is a view of an exemplary gamma curve, which is a representation of a nonlinear function to be optimized.

Referring now to FIG. 3, therein is shown an exemplary gamma curve 300, which is a simple representative of a nonlinear function to be optimized. The nonlinear function is of a type that occurs in the exemplary DSC signal processing pipeline 100 of FIG. 1.

The signal from the gamma transformation 112 and the cubic spline fitting 114 are used to illustrate the effectiveness of cubic spline fitting in reducing the number of parameters for nonlinear optimization. The gamma transformation 112 in the DSC signal processing pipeline 100 converts an input linear RGB signal into a nonlinear RGB signal to be optimized. The exemplary gamma curve 300 is a simple representation of a nonlinear function to be optimized.

To constrain the range of the curve, input $(R_{lin}, G_{lin}, B_{lin})$ is normalized within [0,1] where $(R_{lin}, G_{lin}, B_{lin})=(1, 1, 1)$ means 100% reflectance of a target color patch.

Referring now to FIGS. 4 and 5, therein are shown a gamma domain chart 400 and a difference of gamma to sRGB domain chart 500.

To find an optimal gamma curve that contributes to minimize both color error and propagated noise in the signal processing pipeline 100 of FIG. 1, a parametric function needs to be defined to represent gamma where its parameters are to be optimized.

Since an sRGB curve ($\gamma \approx 2.2$) is a standard used with most cameras and personal computer (PC) monitors, the nonlinear gamma function is defined in the domain of difference to sRGB as illustrated in FIGS. 4 and 5 for clear and easy interpretation in terms of color imaging.

Therefore, the sRGB curve 402 in the gamma domain 400 corresponds to the sRGB line 502 connecting (0,0) and (1,1) in the difference of gamma to sRGB domain of FIG. 5. In order to accommodate application-specific restrictions on the shape of the gamma curve 404, a set of critical points 406 $\{Cx_i, Cy_i\}$ are defined that are kept constant during optimization. The dashed arrow connecting FIGS. 4 and 5 represent the set of critical points and emphasizes that the vertical scale of FIG. 4 is the same as the horizontal scale of FIG. 5.

Optimization is applied to the gamma curve 504 of FIG. 5.

Figure 6:
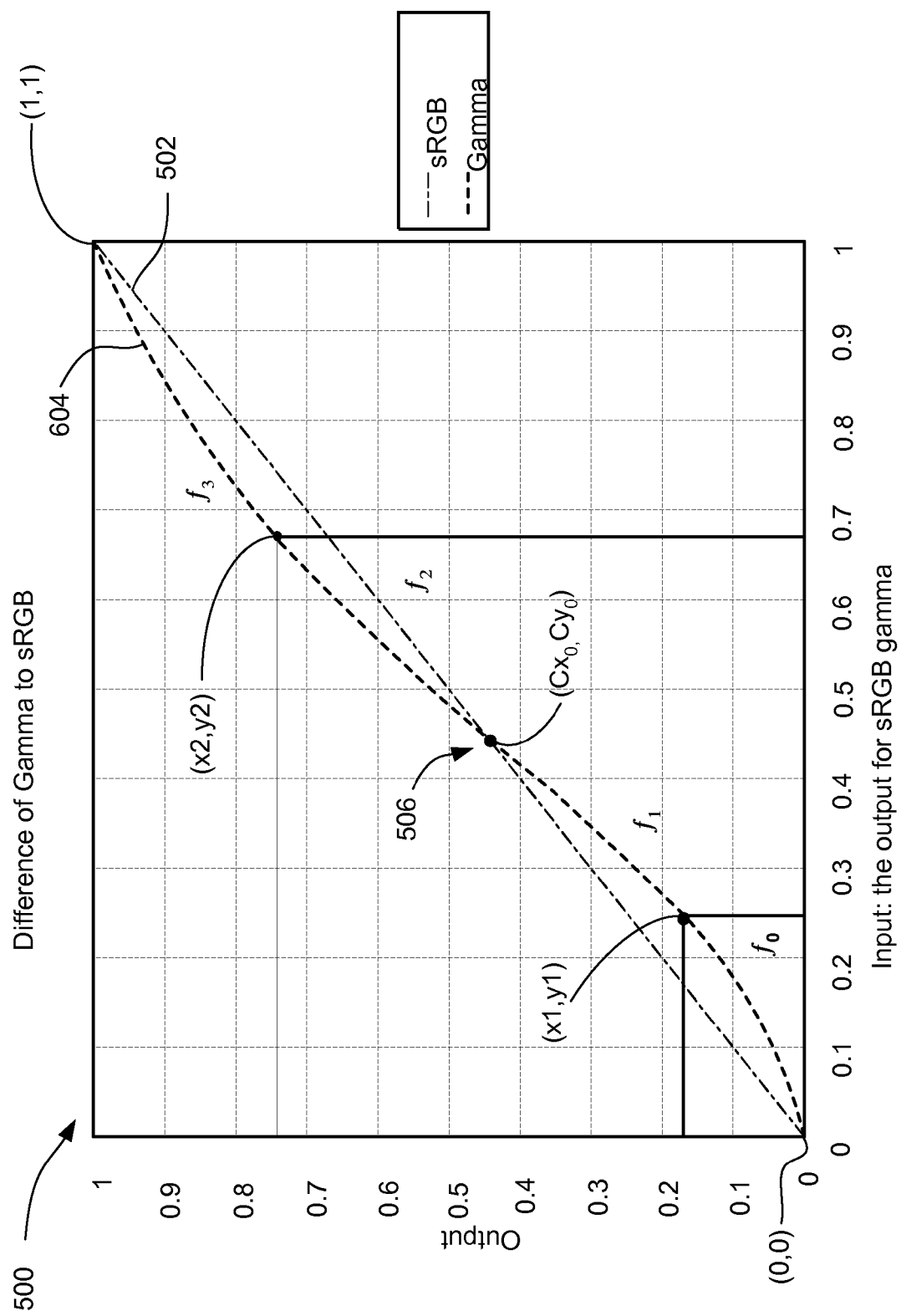
FIG. 6 is a close up view of the difference of gamma to sRGB domain chart with piecewise continuous cubic spline fitting in accordance with an embodiment of the present invention.

Referring now to FIG. 6, therein is shown a close up view of the difference of gamma to sRGB domain chart 500 with piecewise continuous cubic spline fitting in accordance with an embodiment of the present invention.

To apply cubic spline curve fitting for gamma function approximation, five control points are specified in the domain of difference to sRGB as shown in FIG. 6. These points include (0,0), (x1,y1), $(Cx_0, Cy_0)$, (x2,y2), and (1,1). Therefore, four cubic polynomials, $f_0, f_1, f_2$, and $f_3$, need to be fitted according to the equation:

$$f_i(x) = d_i x^3 + c_i x^2 + b_i x + a_i$$

where: $x \in [0,1]$ and $i=0,\Lambda,3$

According to the rules for cubic splines, the cubic polynomials need to satisfy the following conditions to ensure the continuity of the nonlinear function as well as its first and second derivatives at the control points:

$$f_0(0)=0, f_0(x1)=y1$$

$$f_1(x_1)=y1, f_1(Cx_0)=Cy_0$$

$$f_2(Cx_0)=Cy_0, f_2(x2)=y2$$

$$f_3(x2)=y2, f_3(1)=1$$

$$f'_0(x1)=f'_1(x1), f'_1(Cx_0)=f'_2(Cx_0), f'_2(x2)=f'_3(x2)$$

$$f''_0(x1)=f''_1(x1), f''_1(Cx_0)=f''_2(Cx_0), f''_2(x2)=f''_3(x2)$$

$$f''_0(0)=0, f''_3(1)=0$$

Besides the constraints imposed by cubic spline fitting, more restrictions may be applied on the parameters or on the nonlinear function itself. These constraints vary according to different applications. For example, in order to assure the feasibility of the gamma function in the DSC signal processing pipeline 100 of FIG. 1, the following restrictions may be applied during the cubic spline fitting:

$$0 < x1 < Cx_0, 0 < y1 < Cy_0$$

$$Cx_0 < x2 < 1, Cy_0 < y2 < 1$$

$$x1 > y1, x2 < y2$$

$$a < Cy_0 < b$$

$$f'_0(0) > \phi_0, f'_3(1) > \phi_1$$

where: a, b, $\phi_0$, $\phi_1$ are constants whose values are determined empirically.

When the above described cubic curve fitting is applied in DSC gamma function approximation, five unfixed parameters are to be optimized, i.e. (x1, y1), (x2, y2), and $Cy_0$. In this step, different optimization methods can be used such as gradient descent or Newton's method. Where the standard gradient descent function in MATLAB is used in experiments, an optimized gamma curve 604 appears as shown in FIG. 6.

Figures 7, 8:
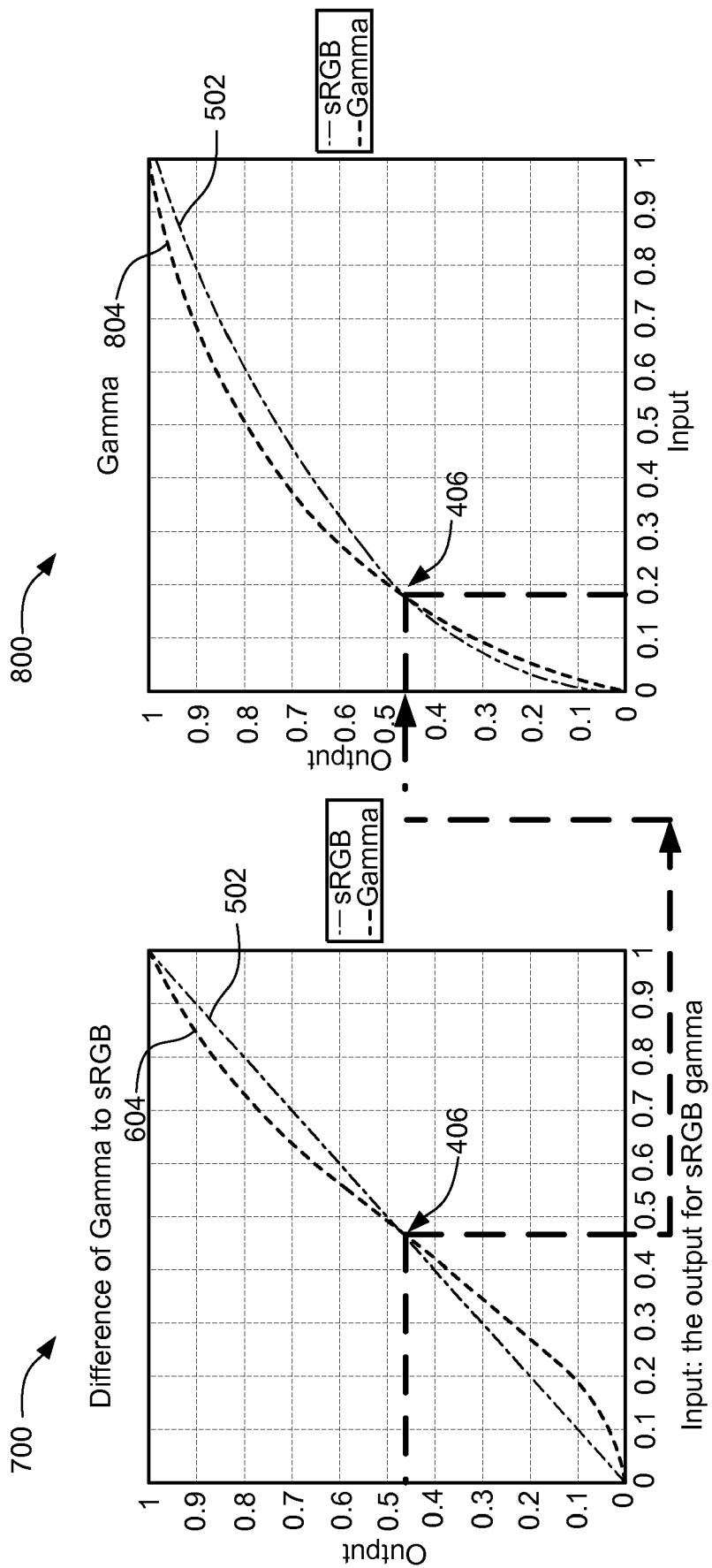
FIGS. 7 and 8 are a gamma domain chart and a difference of gamma to sRGB domain chart with an optimized gamma function using cubic curve fitting in accordance with an embodiment of the present invention.

Referring now to FIGS. 7 and 8, therein are shown a gamma domain chart and a difference of gamma to sRGB domain chart with an optimized gamma function using cubic curve fitting in accordance with an embodiment of the present invention.

An experiment was performed using Macbeth ColorChecker (24 color patches) as the target to test the performance of cubic spline fitting. In the formulation of nonlinear objective function, color error (measured in L*a*b* space as $\Delta E^*_{ab}$) is minimized to find the optimal gamma function. Five parameters were involved in the optimization process. The resulted metric is $\Delta E^*_{ab}=9.5629$.

In FIG. 7, the gamma curve 604 is shown optimized by nonlinear approximation using piecewise continuous cubic spline fitting in accordance with an embodiment of the present invention. The set of critical points 406 remains constant and the transformation back to the gamma domain 800 is shown by the optimized gamma curve 804 in FIG. 8. Through visual analysis, gamma optimization using cubic spline fitting provided satisfactory visual results since the gamma curve 804 presents all the desired properties compared to the sRGB curve 502.

Compared to the other curve fitting methods, it has been discovered that the cubic spline fitting approach significantly reduces the number of parameters required to approximate gamma by at least a third.

Correspondingly, the complexity of nonlinear optimization is significantly reduced and the processing speed is improved. Therefore, the cubic spline fitting method enables real-time implementation of gamma transformation in signal processing and more specifically in the DSC signal processing pipeline 100 of FIG. 1.

Furthermore, the reduction of the size of the set of fitted polynomial parameters decreases the possibility of being trapped into local minima during optimization.

Gamma function optimization in the DSC signal processing pipeline 100 of FIG. 1 is provided only as one example to illustrate the implementation and effectiveness of cubic spline fitting in nonlinear objective function approximation to reduce the size of the set of fitted polynomial parameters. However, it is important to realize that the cubic spline fitting approach can be applied to any nonlinear optimization problem and will achieve better performance by reducing the number of parameters.

Figure 9:
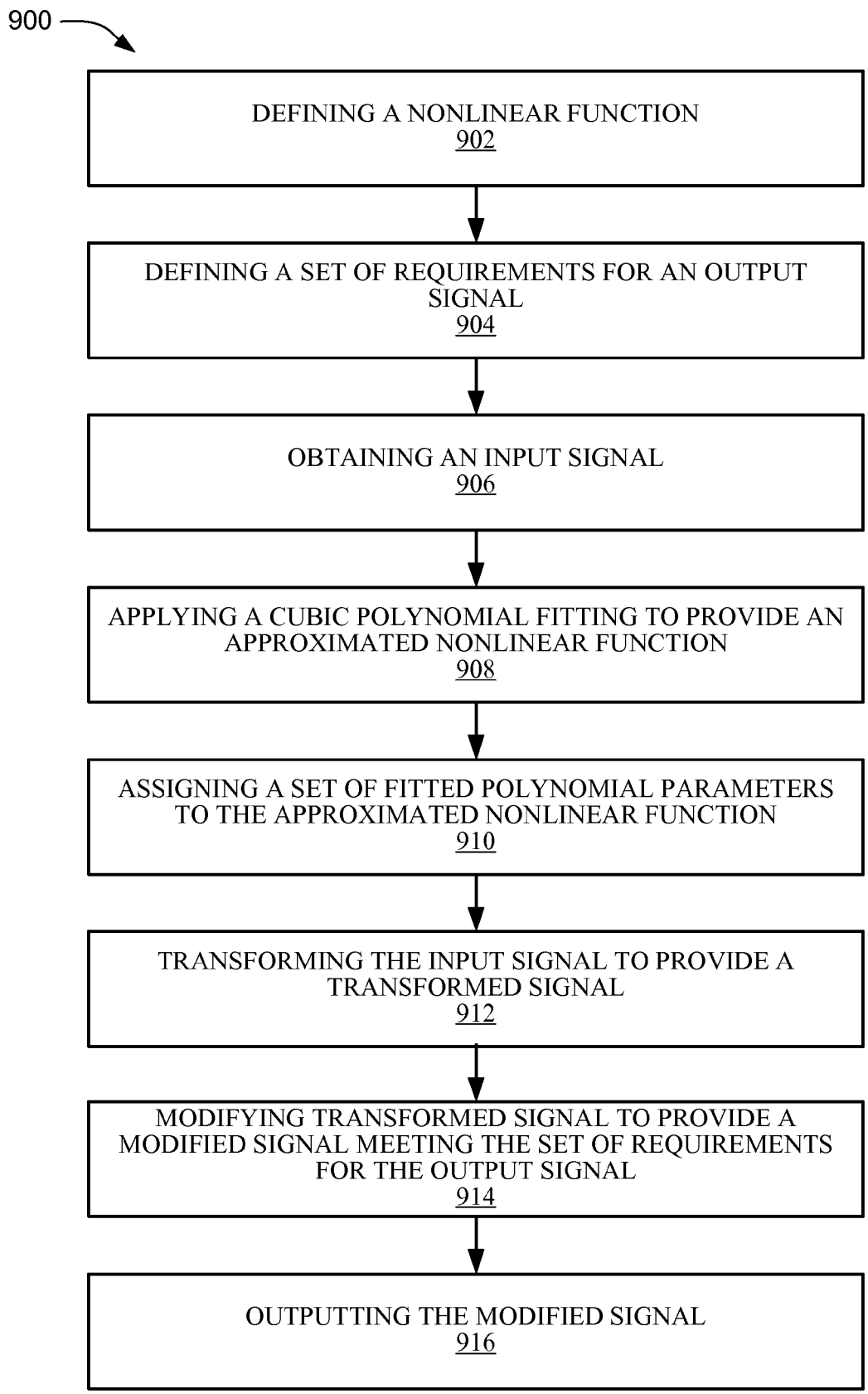
FIG. 9 is a flow chart of a signal processing system in accordance with the present invention.

Referring now to FIG. 9, therein is shown a signal processing system 900 including: defining a nonlinear function in a block 902; defining a set of requirements for an output signal in a block 904; obtaining an input signal in a block 906; applying a cubic polynomial fitting to approximate the nonlinear function and provide an approximated nonlinear function in a block 908; assigning a set of fitted polynomial parameters to the approximated nonlinear function in a block 910; transforming the input signal with the approximated nonlinear function to provide a transformed signal in a block 912; modifying transformed signal by adjusting the set of fitted polynomial parameters to provide a modified signal meeting the set of requirements for the output signal in a block 914; and outputting the modified signal in a block 916.

Figure 10:
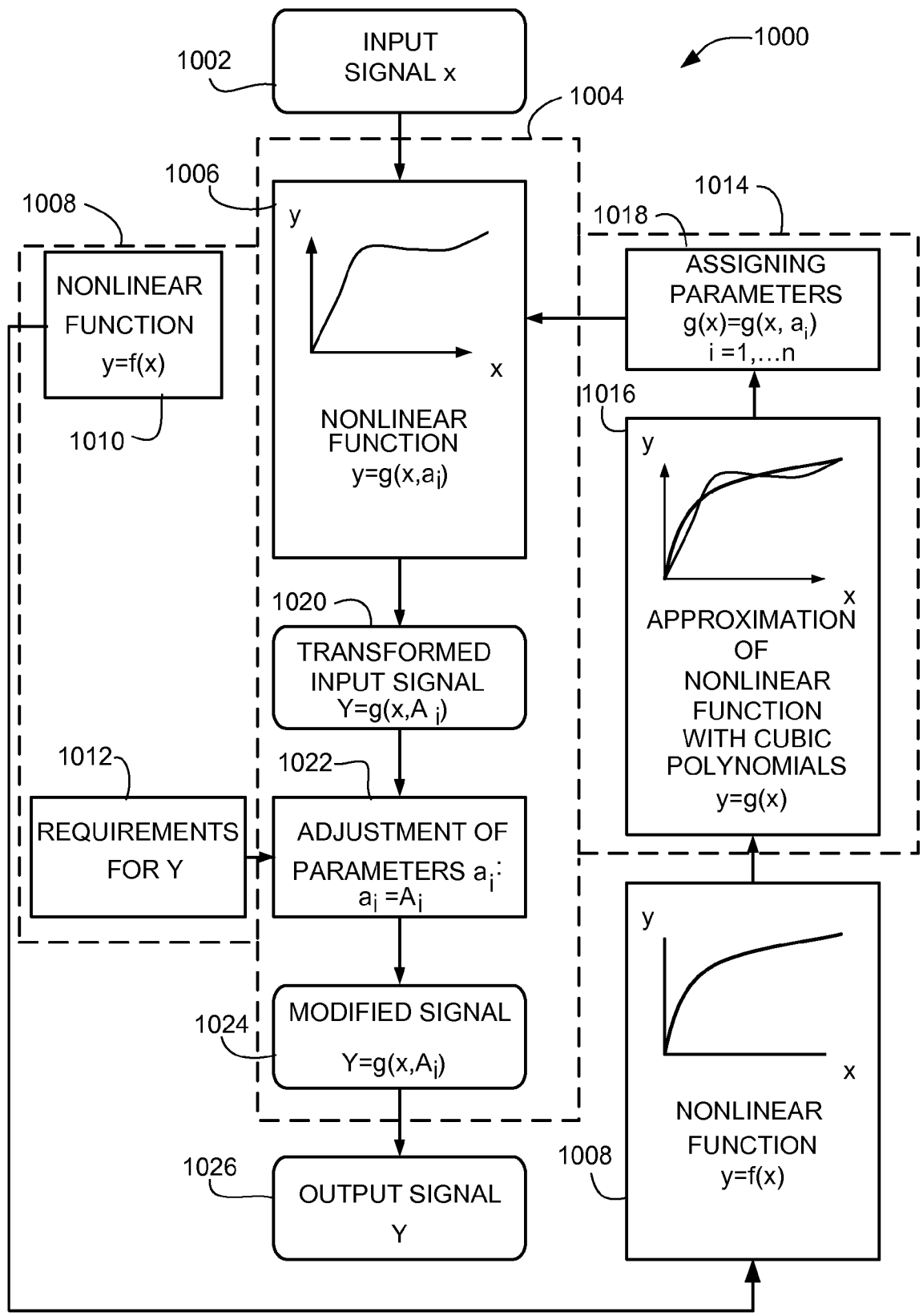
FIG. 10 is a signal processing system 1000 in accordance with an embodiment of the present invention.

Referring now to FIG. 10, therein is shown a signal processing system 1000 in accordance with an embodiment of the present invention. One of the goals of the present invention is to have the signal processing system 1000 with a better nonlinear function y=f(x) than previous signal processing systems.

An input system 1002 provides an input signal x to be transformed in a transformation system 1004 by a nonlinear function $y=g(x,a_i)$ in a block 1006.

A requirements system 1008 defines a nonlinear function in a block 1010 and a set of requirements for an output signal in a block 1012.

A cubic spline fitting system 1014 applies a cubic polynomial fitting to approximate the nonlinear function of the block 1010 by an approximation of the nonlinear function with cubic polynomials y=g(x) in a block 1016. The cubic spline fitting system 1014 provides the approximated nonlinear function from the block 1016 for assigning a set of fitted polynomial parameters to the approximated nonlinear function $g(x)=g(x,a_i)$ for I=1, . . . n in a block 1018.

The set of fitted polynomial parameters from the block 1018 are used in the block 1006 of the transformation system 1004. The transformation system 1004 provides a transformed input signal $Y=g(x,A_i)$ at a block 1020.

The transformed input signal from the block 1020 is modified by adjusting the set of fitted polynomial parameters $a_i$ where $a_i=A_i$ in a block 1022 to provide a modified signal $Y=g(x,a_i)$ in a block 1024.

The modified signal from the block 1024 is then provided as an output signal Y at a clock 1026.

In general, embodiments of the present invention may be applied to any nonlinear optimization program, which can benefit from approximation of nonlinear objective functions.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation for a signal processing system comprising:
    defining a nonlinear function via a requirements system;
    defining a set of requirements for an output signal from the requirements system;
    obtaining an input signal for a transformation system;
    applying a cubic polynomial fitting to approximate the nonlinear function and provide an approximated nonlinear function via a cubic spline fitting system;
    assigning a set of fitted polynomial parameters to the approximated nonlinear function via the cubic spline fitting system;
    transforming the input signal with the approximated nonlinear function to provide a transformed signal via the transformation system;
    modifying the transformed signal by adjusting the set of fitted polynomial parameters to provide a modified signal meeting the set of requirements for the output signal via the transformation system; and
    outputting the modified signal as the output signal from the transformation system.

2. The method as claimed in claim 1 further comprising:
    defining a set of requirements for the output signal as a measure of goodness of the output signal via the requirements system; and
    adjusting the set of fitted polynomial parameters to optimize the signal processing system by maximizing the goodness of the modified signal via the transformation system.

3. The method as claimed in claim 1 further comprising:
    defining the nonlinear function as the approximated nonlinear function with an adjusted set of fitted polynomial parameters via the requirements system to design a nonlinear signal processing system.

4. The method as claimed in claim 1 further comprising:
    defining a set of requirements for the output signal as a predetermined modified signal via the requirements system; and
    locking the set of fitted polynomial parameters to provide a modified signal approximating the predetermined modified signal to calibrate a nonlinear signal processing system via the transformation system.

5. The method as claimed in claim 1 further comprising:
    providing an input system for providing different input signals; and
    modifying the set of fitted polynomial parameters for each of the different input signals to provide modified signals meeting the set of requirements for the output signal to adaptively change via the cubic spline fitting system a nonlinear signal processing system.

6. A method for a signal processing system comprising:
    defining a nonlinear gamma function via a requirements system;
    defining a set of requirements for a color transformed signal via the requirements system;
    capturing an image to provide an image signal via an image sensor;
    demosaicking the image signal to provide a demosaicked signal from a demosaicking system;
    calculating tristimulus values from the demosaicked signal to provide a tristimulus signal via a transformation system;
    applying a cubic polynomial fitting to approximate the nonlinear gamma function and provide an approximated nonlinear gamma function via the transformation system;

assigning a set of fitted polynomial parameters to the approximated nonlinear gamma function via the transformation system;

transforming the tristimulus signal with the approximated nonlinear function to provide the transformed signal via the transformation system;

modifying the transformed signal by adjusting the set of fitted polynomial parameters to provide a modified signal meeting the set of requirements for the transformed signal via the transformation system;

color calibrating the modified signal to provide a color transformed signal from the transformation system; and outputting the color transformed signal to a display or storage from the transformation system.

7. The method as claimed in claim 6 further comprising:
defining a set of requirements for the transformed signal as a measure of the goodness of the transformed signal via the transformation system; and
adjusting the set of fitted polynomial parameters to optimize the signal processing system by maximizing the goodness of the transformed signal via the transformation system.

8. The method as claimed in claim 6 further comprising:
defining the nonlinear gamma function as the approximated nonlinear gamma function with an adjusted set of fitted polynomial parameters via the transformation system to design a nonlinear signal processing system.

9. The method as claimed in claim 6 further comprising:
defining a set of requirements for the transformed signal as a predetermined modified signal via the transformation system; and
locking the set of fitted polynomial parameters to provide a modified signal approximating the predetermined modified signal to calibrate a nonlinear signal processing system via the transformation system.

10. The method as claimed in claim 6 further comprising:
providing a camera system for providing different image signals; and
modifying the set of fitted polynomial parameters for each of the different input signals to provide modified signals meeting the set of requirements for the output signal to adaptively change the camera system via the transformation system.

11. A signal processing system comprising:
a requirements system for defining a nonlinear function and a set of requirements for an output signal;
a cubic spline fitting system for applying a cubic polynomial fitting to approximate the nonlinear function and provide an approximated nonlinear function, the cubic spline fitting system for assigning a set of fitted polynomial parameters to the approximated nonlinear function; and
a transformation system for transforming the input signal with the approximated nonlinear function to provide a transformed signal and modifying the transformed signal by adjusting the set of fitted polynomial parameters to provide a modified signal meeting the set of requirements for the output signal, the transformation system for outputting the modified signal as the output signal.

12. The system as claimed in claim 11 wherein:
the requirements system for defining a set of requirements for the output signal as a measure of goodness of the output signal; and
the transformation system for adjusting the set of fitted polynomial parameters to optimize the signal processing system by maximizing the goodness of the modified signal.

13. The system as claimed in claim 11 further comprising:
a nonlinear signal processing system; and
the requirements system for defining the nonlinear function as the approximated nonlinear function with an adjusted set of fitted polynomial parameters to design the nonlinear signal processing system.

14. The system as claimed in claim 11 further comprising:
a nonlinear signal processing system;
the requirements system for defining a set of requirements for the output signal as a predetermined modified signal; and
the transformation system for locking the set of fitted polynomial parameters to provide a modified signal approximating the predetermined modified signal to calibrate the nonlinear signal processing system.

15. The system as claimed in claim 11 further comprising:
a nonlinear signal processing system;
an input system for providing different input signals; and
the cubic spline fitting system for modifying the set of fitted polynomial parameters for each of the different input signals to provide modified signals meeting the set of requirements for the output signal to adaptively change the nonlinear signal processing system.

16. A signal processing system comprising:
a requirements system for defining a nonlinear gamma function and a set of requirements for a color transformed signal;
an image sensor for capturing an image to provide an image signal;
a demosaicking system for processing the image signal to provide a demosaicked signal;
a color transformation system for:
  calculating tristimulus values from the demosaicked signal to provide a transformed signal;
  applying a cubic polynomial fitting to approximate the nonlinear gamma function and provide an approximated nonlinear gamma function;
  assigning a set of fitted polynomial parameters to the approximated nonlinear gamma function;
  modifying the transformed signal with the nonlinear gamma signal by adjusting the set of fitted polynomial parameters to provide a modified signal meeting the set of requirements for the color transformed signal;
  color calibrating the modified signal to provide the color transformed signal;
  outputting the color transformed signal; and
a display or storage system for receiving the color transformed signal.

17. The system as claimed in claim 16 wherein:
the color transformation system is for:
  defining a set of requirements for the color transformed signal as a measure of the goodness of the color transformed signal; and
  adjusting the set of fitted polynomial parameters to optimize the signal processing system by maximizing the goodness of the color transformed signal.

18. The system as claimed in claim 16 wherein:
the color transformation system is for defining the nonlinear gamma function as the approximated nonlinear gamma function with an adjusted set of fitted polynomial parameters to design a nonlinear signal processing system.

19. The system as claimed in claim 16 wherein:

the color transformation system is for:

- defining a set of requirements for the color transformed signal as a predetermined modified signal; and
- locking the set of fitted polynomial parameters to provide a modified signal approximating the predetermined modified signal to calibrate a nonlinear signal processing system.

20. The system as claimed in claim 16 further comprising:

- a camera system for providing different image signals for different types of images; and
- the color transformation system for modifying the set of fitted polynomial parameters for each of the different input signals to provide modified signals meeting the set of requirements for the color transformed signal to adaptively change the camera system.

* * * * *

UNITED STATES PATENT AND TRADEMARK OFFICE
CERTIFICATE OF CORRECTION

| | | |
|---|---|---|
| PATENT NO. | : 7,852,380 B2 | Page 1 of 1 |
| APPLICATION NO. | : 11/738443 | |
| DATED | : December 14, 2010 | |
| INVENTOR(S) | : Wang et al. | |

It is certified that error appears in the above-identified patent and that said Letters Patent is hereby corrected as shown below:

Column 3:

line 10, delete "captured and demosaicked image in various spaces where" and insert therefor --captured and demosaicked image in various color spaces where--

Signed and Sealed this
Nineteenth Day of April, 2011

David J. Kappos
*Director of the United States Patent and Trademark Office*

UNITED STATES PATENT AND TRADEMARK OFFICE
CERTIFICATE OF CORRECTION

PATENT NO. : 7,852,380 B2  Page 1 of 1
APPLICATION NO. : 11/738443
DATED : December 14, 2010
INVENTOR(S) : Wang et al.

It is certified that error appears in the above-identified patent and that said Letters Patent is hereby corrected as shown below:

Column 3:

line 10, delete "captured and demosaicked image in various spaces where" and insert therefor --captured and demosaicked image in various color spaces where--

Column 4 lines, 56- 63, delete

"...nonlinear signal as follows:
  The function values at the two ends of each curve section equal to values of corresponding control points.
  The first and second derivatives at the end of a curve section equal to the first and second derivatives at the start of the connecting curve section.
  The second derivatives at the end points of the curve approximating the nonlinear signal are set to zero, i.e.,"

and insert therefor

--...nonlinear signal as follows:
- The function values at the two ends of each curve section equal to values of corresponding control points.
- The first and second derivatives at the end of a curve section equal to the first and second derivatives at the start of the connecting curve section.
- The second derivatives at the end points of the curve approximating the nonlinear signal are set to zero, i.e.,--

This certificate supersedes the Certificate of Correction issued April 19, 2011.

Signed and Sealed this
Twenty-eighth Day of June, 2011

David J. Kappos
*Director of the United States Patent and Trademark Office*